UNITED STATES PATENT OFFICE.

JOHN TOWNSEND, OF DARBY, PENNSYLVANIA.

IMPROVEMENT IN VARNISHING COMPOUNDS FOR CARRIAGE-TOPS, &c.

Specification forming part of Letters Patent No. 148,582, dated March 17, 1874; application filed September 5, 1873.

*To all whom it may concern:*

Be it known that I, JOHN TOWNSEND, of Darby, Delaware county, Pennsylvania, have invented a Polishing Composition for Carriage-Tops, &c., of which the following is a specification:

The object of my invention is to polish or enamel carriage-tops, harness, leather, &c., and to prevent the same from cracking; and this object I accomplish by the use of a composition composed of carriage-varnish, neat's-foot oil, ivory black, and japan, mixed in about the following proportions: Carriage-varnish, three quarts; neat's-foot oil, one pint; ivory drop black, one-half pint; japan, one-half pint. The ivory drop black, in the form of a powder, is ground in about one-half pint of neat's-foot oil, and the product is then mixed with the other ingredients, no heat being applied, and the only requisite being that the whole shall be thoroughly agitated or stirred, so as to produce an intimate mixture of all the ingredients. The composition is then ready for use, and may be applied with a cloth or sponge just as with ordinary oil. It is intended for carriage-tops especially, and when well rubbed in will dry in from three to four hours, producing a highly-polished or enameled surface, and as the said composition is of an elastic nature it will preserve and prevent the cracking of the varnished top. The composition can also be used for polishing and preserving harness and leather generally.

I claim as my invention—

The within-described polishing composition for carriage-tops, &c., composed of varnish, neat's-foot oil, ivory black, and japan, mixed substantially as and in about the proportions specified.

In testimony whereof I have signed my name to this specification in the presence of two subscribing witnesses.

JOHN TOWNSEND.

Witnesses:
 WM. A. STEEL,
 HUBERT HOWSON.